US006355313B1

(12) United States Patent
Yoshimura et al.

(10) Patent No.: US 6,355,313 B1
(45) Date of Patent: Mar. 12, 2002

(54) PROCESS FOR SURFACE TREATMENT OF HOLLOW WORK HAVING HOLE COMMUNICATING WITH OUTSIDE

(75) Inventors: Kohshi Yoshimura, Hyogo; Takeshi Nishiuchi; Fumiaki Kikui, both of Osaka, all of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/512,655

(22) Filed: Feb. 24, 2000

(30) Foreign Application Priority Data

Feb. 26, 1999 (JP) .......................................... 11-051935

(51) Int. Cl.$^{7}$ ............................................... B29C 35/08

(52) U.S. Cl. ....................... 427/598; 427/127; 427/181; 427/191; 427/192; 427/194; 427/231; 427/242; 427/428

(58) Field of Search ................................ 427/127, 598, 427/181, 548, 192, 191, 194, 231, 242, 428

(56) References Cited

U.S. PATENT DOCUMENTS 3,013,892 A * 12/1961 Songas

FOREIGN PATENT DOCUMENTS

| | | |
|---|---|---|
| JP | 3-87377 | 4/1991 |
| JP | 07-302705 | 11/1995 |
| JP | 11-195515 | 7/1999 |
| JP | 11-233324 | 8/1999 |
| JP | 11-238641 | 8/1999 |
| JP | 11-260614 | 9/1999 |

* cited by examiner

*Primary Examiner*—Bernard Pianalto
(74) *Attorney, Agent, or Firm*—Armstrong, Westerman & Hattori, LLP

(57) ABSTRACT

A hollow work having a hole communicating with the outside and a fine metal powder producing material are placed into a treating vessel, where the fine metal powder producing material is brought into flowing contact with the surface of the work, thereby adhering a fine metal powder produced from the fine metal powder producing material to the surface of the work. The hollow work may be a ring-shaped bonded magnet. Thus, a film having an excellent corrosion resistance can be formed without use of a third component such as a resin and a coupling agent by providing an electric conductivity to the entire surface of the magnet, i.e., not only to the outer surface (including end faces) but also to the inner surface of the magnet and subjecting the magnet to an electroplating treatment.

10 Claims, 15 Drawing Sheets

PROCESS FOR SURFACE TREATMENT OF HOLLOW WORK HAVING HOLE COMMUNICATING WITH OUTSIDE

BACKGROUND OF THE INVENTION

1. Field of the Invention

The present invention relates to a process for surface treatment of a hollow work having a hole communicating with the outside, particularly, a ring-shaped work such as a ring-shaped bonded magnet, and to a ring-shaped bonded magnet produced by the process. More particularly, the present invention relates to a surface treating process which comprises bringing a fine metal powder producing material into flowing contact with the surface of a work, thereby adhering a fine metal powder produced from the fine metal powder producing material to the surface of the work, and to a ring-shaped bonded magnet produced by the process and having a film layer made of the fine metal powder on the entire surface thereof.

2. Description of the Related Art

A rare earth metal-based permanent magnet such as an R—Fe—B based permanent magnet represented by an Nd—Fe—B based permanent magnet is produced using a material which is rich in resources and inexpensive and has a high magnetic characteristic, as compared with an Sm—Co based permanent magnet. Therefore, particularly, the R—Fe—B based permanent magnet is used in a variety of fields at present.

In recent years, in electronic industries and appliance industries, a reduction in size of parts is advancing, and in correspondence to this, a reduction in size and a complication in shape of the magnet itself are required.

From this viewpoint, attention is given to a bonded magnet which is produced using a magnetic powder and a resin binder as main components and which is easy to shape. Among others, a ring-shaped bonded magnet is utilized particularly in various small-sized motors such as a spindle motor, a servomotor incorporated in an actuator and the like.

The rare earth metal-based permanent magnet contains a rare earth metal R which is liable to be corroded by oxidation in the atmosphere. Therefore, when the rare earth metal-based permanent magnet is used without being subjected to a surface treatment, the corrosion advances from the surface of the magnet under the influence of a small amount of an acid, an alkali or water to generate a rust in the magnet, thereby bringing about the deterioration and dispersion of the magnetic characteristic. Further, when the magnet having a rust generated therein is incorporated in a magnetic circuit, it is feared that the rust is scattered to pollute the surrounding parts.

To solve this problem, an attempt has been made to form a plated film as a corrosion-resistant film on the surface of the magnet. However, when the bonded magnet is subjected directly to an electroplating treatment, a uniform and dense plated film cannot be formed, because the magnetic powder particles insulated by the resinous binder forming the surface of the magnet and the resin portion between the magnetic powder particles are lower in electric conductivity. As a result, pinholes (non-plated portions) may be produced to bring about a rust in some cases.

Therefore, processes which involve providing an electric conductivity to the entire surface of a bonded magnet and subjecting the bonded magnet to an electroplating treatment, have been already proposed in Japanese Patent Application Laid-open Nos. 5-302176, 7-161516, 11-3811 and the like.

These processes proposed in the above Patents are intended to provide the electric conductivity to the entire surface of the magnet by adhering a metal powder to the entire surface of the magnet by utilizing the tackiness of a third component such as a resin and a coupling agent. In such processes, however, it is difficult to adhere the metal powder uniformly to the inner surface of a ring-shaped bonded magnet and among others, a ring-shaped bonded magnet having a large L/D value (wherein L represents a length of the magnet in a direction of a center axis of the magnet, and D represents an inside diameter of the magnet) to form an electrically conductive layer. This is because as the larger the L/D value, the more both of the metal powder and the third component such as the resin are sufficiently not spread into the through-hole in the magnet.

Further, in these processes, an increase in cost is brought about, because the third component is required, and moreover, it is difficult to uniformly form the electrically conductive layer on the entire surface of the magnet. As a result, it is difficult to carry out the surface treatment at a high dimensional accuracy. Additionally, a step of curing an uncured resin is required, resulting in a complicated producing process. Furthermore, when media such as steel balls are employed as a metal powder adhering means, it is feared that cracking or chipping of the bonded magnet may be brought about.

SUMMARY OF THE INVENTION

Accordingly, it is an object of the present invention to provide a process for surface treatment of a ring-shaped bonded magnet, wherein an electric conductivity can be provided to the entire surfaces of the magnet, i.e., not only to the outer surface (including end faces and so on) but also to the inner surface of the magnet without use of a third component such as a resin and a coupling agent, and a film having an excellent corrosion resistance can be formed on the surface of the magnet at a high thickness accuracy by an electroplating treatment or the like.

The present inventors have made various studies with the forgoing in view and as a result, they have found that when a fine metal powder producing material is brought into flowing contact with the surface of a hollow work having a hole communicating with the outside in a treating vessel, a fine metal powder is produced from the fine metal powder producing material and brought in a flowing state into contact with not only the outer surface but also the inner surface of the work, whereby it is adhered firmly and at a high density to the entire surface of the work.

The present invention has been accomplished based on such knowledge, and to achieve the above object, according to a first aspect and feature of the present invention, there is provided a process for surface treatment of a hollow work having a hole communicating with the outside, comprising the steps of placing the work and a fine metal powder producing material into a treating vessel, and bringing the fine metal powder producing material into flowing contact with the surface of the work in the treating vessel, thereby adhering a fine metal powder produced from the fine metal powder producing material to the surface of the work.

According to a second aspect and feature of the present invention, in addition to the first feature, the flowing contact of the fine metal powder producing material with the surface of the hollow work is achieved by rotating the treating vessel.

According to a third aspect and feature of the present invention, in addition to the second feature, the treating vessel is cylindrical in shape, and the flowing contact of the fine metal powder producing material with the surface of the hollow work is achieved by rotating the cylindrical treating vessel about its center axis.

According to a fourth aspect and feature of the present invention, in addition to the first feature, the hollow work having the hole communicating with the outside is a ring-shaped work.

According to a fifth aspect and feature of the present invention, in addition to the fourth feature, the ring-shaped work is placed into the cylindrical treating vessel, so that its center axis is parallel to a center axis of the cylindrical treating vessel, and the flowing contact of the fine metal powder producing material with the surface of the ring-shaped work is achieved by rotating the cylindrical treating vessel about its center axis.

According to a sixth aspect and feature of the present invention, in addition to the fifth feature, a rod-shaped member is inserted through and disposed in the through-hole in the ring-shaped work, so that it is parallel to the center axis of the ring-shaped work.

According to a seventh aspect and feature of the present invention, in addition to the fourth feature, the ring-shaped work is a ring-shaped rare earth metal-based permanent magnet.

According to an eighth aspect and feature of the present invention, in addition to the seventh feature, the ring-shaped rare earth metal-based permanent magnet is a ring-shaped bonded magnet.

According to a ninth aspect and feature of the present invention, in addition to the first feature, the fine metal powder producing material is a material for producing a fine powder of at least one metal selected from the group consisting of Cu, Fe, Ni, Co, Cr, Sn, Zn, Pb, Cd, In, Au, Ag and Al.

According to a tenth aspect and feature of the present invention, in addition to the ninth feature, the fine metal powder producing material is a fine Cu powder producing material.

According to an eleventh aspect and feature of the present invention, there is provided a ring-shaped bonded magnet having a film layer made of a fine metal powder on the entire surface thereof, which is produced by a surface treating process according to the first feature.

According to a twelfth aspect and feature of the present invention, in addition to the eleventh feature, the ring-shaped bonded magnet having the film layer made of the fine metal powder on the entire surface thereof has an L/D value equal to or larger than 1, wherein L represents a length of the magnet in a direction of a center axis of the magnet, and D represents an inside diameter of the magnet.

According to a thirteenth aspect and feature of the present invention, there is provided a ring-shaped bonded magnet having a plated film, which is produced by subjecting a ring-shaped bonded magnet having a film layer made of a fine metal powder on the entire surface thereof according to the eleventh or twelfth feature to an electroplating treatment.

With the surface treatment process according to the present invention, the fine metal powder produced from the fine metal powder producing material is adhered firmly and at a high density to the entire surface of the hollow work having the hole communicating with the outside, i.e., not only to the outer surface but also to the inner surface of the work, by bringing the fine metal powder producing material into flowing contact with the surface of the hollow work having the hole communicating with the outside. Therefore, with the ring-shaped rare earth metal-based permanent magnet, an electric conductivity can be provided to the entire surface of the magnet without provision of a resin layer on the surface of the magnet. Thus, a film having an excellent corrosion resistance can be formed at a high thickness accuracy by an electroplating treatment.

DETAILED DESCRIPTION OF THE INVENTION

With the surface treatment process according to the present invention, the fine metal powder produced from the fine metal powder producing material is adhered to the entire surface of the hollow work having the hole communicating with the outside by bringing the fine metal powder producing material into flowing contact with the surface of the hollow work having the hole communicating with the outside. Therefore, the work is especially not limited, if it is of such a shape that the fine metal powder producing material is brought into flowing contact with the surface of the work. Particular examples of the shapes are those shown in FIGS. 1*a* to 1*e*. In the works shown in these figures, the hole is made through opposite ends of the work, but, of course, one of the opposite ends of the hole may be closed.

Figure 1A:
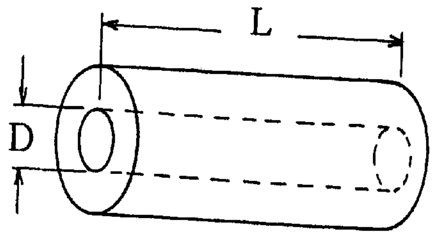
FIGS. 1*a,* 1*b,* 1*c,* 1*d,* and to 1*e* are illustrations of several works used in the surface treatment process of the present invention.
Figure 1B:
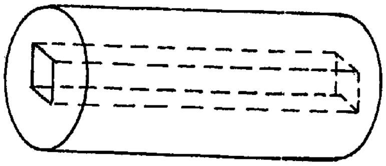
Figure 1C:
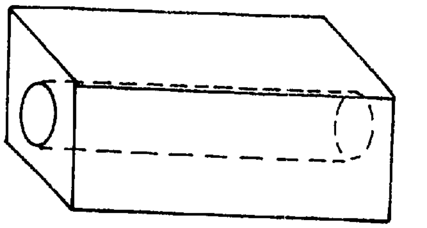
Figure 1D:
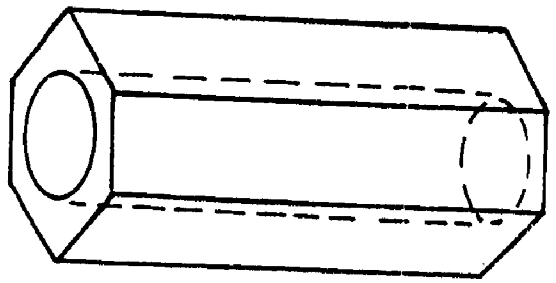
Figure 1E:
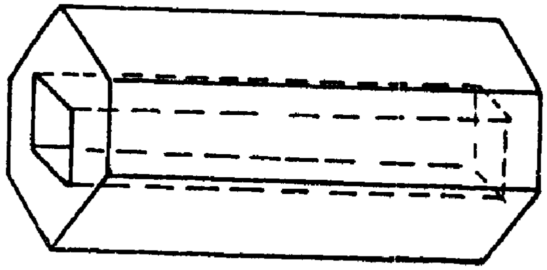

Particular examples of the ring-shaped work shown in FIG. 1*a* are ring-shaped rare earth metal-based permanent magnets such as R—Fe—B based permanent magnets represented by an Nd—Fe—B based permanent magnet, R—Fe—N based permanent magnets represented by an Sm—Fe—N based permanent magnet, and the like.

The ring-shaped rare earth metal-based permanent magnet may be any of various types such as a ring-shaped bonded magnet formed by bonding a magnetic powder by a required binder, a ring-shaped sintered magnet formed by sintering a magnetic powder, and the like. According to the present invention, an electric conductivity can be provided to the magnet by forming a film layer made of the fine metal powder on the entire surface of the magnet without use of a third component such as a resin or a coupling agent. Therefore, the present invention is particularly effective for a ring-shaped bonded magnet in which it has been difficult hitherto to form a dense plated film uniformly on the entire surface of the magnet.

It should be noted that the bonded magnet may be either a magnetically isotropic bonded magnet or a magnetically anisotropic bonded magnet, if it is made using a magnetic powder and a resinous binder as main components. In addition, the bonded magnet may be a bonded magnet made by bonding a magnetic powder by a metal binder or an inorganic binder in addition to the resinous binder, and in this case, a filler may be contained in the binder.

There are conventionally known rare earth metal-based bonded magnets having various compositions and various crystal structures, and the present invention is intended for all of these bonded magnets.

Examples of such bonded magnets are an anisotropic R—Fe—B based bonded magnet as described in Japanese Patent Application Laid-open No.9-92515, an Nd—Fe—B based nanocomposite magnet having a soft magnetic phase (e.g., an $^{\alpha}$—Fe phase and an $Fe_3B$ phase) and a hard magnetic phase (e.g., an $Nd_2Fe_{14}B$ phase) as described in Japanese Patent Application Laid-open No. 8-203714, and a bonded magnet made using an isotropic Nd—Fe—B based magnetic powder (e.g., a powder made by MQI Co., under a trade name of MQP-B) produced by a melt quenching process used conventionally and widely.

Another example is an R—Fe—N based bonded magnet described in Japanese Patent Publication No. 5-82041 and represented by $(Fe_{1-x}R_x)_{1-y}N_y$ wherein $0.07 \leqq x \leqq 0.3$ and $0.001 \leqq y \leqq 0.2$.

The effect of the present invention is not varied depending on the composition and the crystal structure of the magnetic powder forming the bonded magnet and the isotropy and anisotropy of the bonded magnet. Therefore, an intended effect can be obtained in any of the above-described bonded magnets.

The magnetic powder forming the bonded magnet can be produced by a process such as a dissolution and milling process which comprises melting a rare earth metal-based permanent magnet alloy, subjecting it to a casting treatment to produce an ingot, and pulverizing the ingot; a sintered-product pulverizing process which comprises producing a sintered magnet and then pulverizing the sintered magnet; a reduction and diffusion process which produces a magnetic powder directly by the Ca reduction; a rapid solidification process which comprises producing a ribbon foil of a rare earth metal-based permanent magnet alloy by a melting jet caster, and pulverizing and annealing the ribbon foil; an atomizing process which comprises melting a rare earth metal-based permanent magnet alloy, powdering the alloy by atomization and subjecting the powdered alloy to a heat treatment; and a mechanical alloying process which comprises powdering a starting metal, finely pulverizing the powdered metal and subjecting the finely pulverized metal to a heat treatment.

In addition to the above-described process, the magnetic powder forming the R—Fe—N based bonded magnet can be produced by any process such as a gas nitrided process which comprises pulverizing a rare earth metal-based permanent magnet alloy, nitriding the pulverized alloy in an atmosphere of nitrogen gas or ammonia gas, and finely pulverizing the resulting alloy.

Various processes will be described below with the production of a magnetic powder for an R—Fe—B based bonded magnet being taken as an example.

(Dissolution and Milling Process)

This is a producing process including the steps of melting a starting material, subjecting the molten material to a casting to produce an ingot and mechanically pulverizing the ingot. For example, a starting material is a powder which comprises ferroboron alloy containing electrolytically produced iron, boron, the balance of Fe and impurities of Al, Si, C or the like, a rare earth metal, or further containing electrolytically produced cobalt. The starting powder is subjected to a high frequency dissolution followed by a casting in water-cooled casting copper mold. The resulting ingot is pulverized in a hydrogen occlusion manner, or coarsely pulverized by a usual mechanically pulverizing device such as a stamp mill. Then, the coarsely pulverized material is pulverized finely by a dry pulverizing method using a ball mill or a jet mill, or by a wet pulverizing method using any of various solvent.

With such process, it is possible to produce a fine powder comprising a substantially single crystal or several crystal grains and having an average particle size in a range of 1 $\mu$m to 500 $\mu$m.

A magnetic powder having a high coercive force can be produced by forming a fine powder having a required composition and an average particle size of 3 m or less in an oriented manner in the presence of a magnetic field, disintegrating the fine powder, subjecting the disintegrated powder to a heat treatment at a temperature in a range of 800° C. to 1,100° C., and further disintegrating the resulting powder.

(Sintered-product Pulverizing Process)

This is a process which comprises sintering a required R—Fe—B based alloy and pulverizing the sintered product again to produce a magnetic powder. For example, a starting material is a powder which comprises ferroboron alloy containing electrolytically produced iron, boron, the balance of Fe and impurities of Al, Si, C or the like, a rare earth metal, or further containing electrolytically produced cobalt. The starting powder is alloyed by a high frequency dissolution or the like in an inert gas atmosphere, coarsely pulverized using a stamp mill or the like and further finely pulverized by a ball mill or the like. The produced fine powder is subjected to a pressure molding in the presence or absence of a magnetic field, and the molded product is sintered in vacuum or in an inert gas atmosphere which is a non-oxidizing atmosphere. The sintered product is pulverized again to produce a fine powder having an average particle size in a range of 0.3 μm to 100 μm. Thereafter, the fine powder may be subjected to a heat treatment at a temperature in a range of 500° C. to 1,000° C. in order to increase the coercive force.

(Reduction and Diffusion Process)

A starting powder comprising at least one metal powder selected from a ferroboron powder, a ferronickel powder, a cobalt powder, an iron powder and a rare earth metal oxide powder, and/or an oxide powder, is selected depending on a composition of a desired starting alloy powder. Metal calcium (Ca) or $CaH_2$ is mixed with the starting powder in an amount 1.1 to 4.0 times (by weight) a stoichiometrically required amount required for the reduction of the rare earth metal oxide. The mixture is heated to a temperature in a range of 900° C. to 1,200° C. in an inert gas atmosphere, and the resulting reaction product is thrown into water, whereby a by-product is removed, thereby providing a powder which has an average particle size in a range of 10 μm to 200 μm and which is not required to be coarsely pulverized. The produced powder may be further pulverized finely by a dry pulverization using a ball mill, a jet mill or the like.

A magnetic powder having a high coercive force can be produced by forming a fine powder having a required composition and an average particle size of 3 μm or less in an oriented manner in the presence of a magnetic field, disintegrating the fine powder, subjecting the disintegrated powder to a heat treatment at a temperature in a range of 800° C. to 1,100° C., and further disintegrating the resulting powder.

(Rapid Solidification Process)

A required R—Fe—B based alloy is dissolved and subjected to a melt-spin in a jet caster to produce a ribbon foil having a thickness on the order of 20 μm. The ribbon foil is pulverized and subjected to an annealing treatment to provide a powder having fine crystal grains of 0.5 μm or less.

The powder produced from the ribbon foil and having the fine crystal grains is subjected to a hot pressing and a die upsetting treatment to produce a bulk magnet having an anisotropy. The bulk magnet may be pulverized finely.

(Atomizing Process)

This is a process which comprises dissolving a required R—Fe—B based alloy, dropping the molten alloy from a fine nozzle, atomizing the molten alloy at a high speed by an inert gas or a liquid, subjecting the atomized alloy to a sieving or a pulverization, and then subjecting the resulting material to a drying treatment or an annealing treatment to produce a magnetic powder.

The powder having fine crystal grains is subjected to a hot pressing and a die upsetting treatment to produce a bulk magnet having an anisotropy. The bulk magnet may be pulverized finely.

(Mechanical Alloying Process)

This is a process which comprises mixing and converting a required starting powder to an amorphous structure at an atom level in an inert gas atmosphere by a ball mill, a vibrating mill, a dry attriter or the like, and subjecting the resulting powder to an annealing treatment to produce a magnetic powder.

The powder having fine crystal grains is subjected to a hot pressing and a die upsetting treatment to produce a bulk magnet having an anisotropy. The bulk magnet may be pulverized finely.

Examples of processes which are capable of providing a magnetic anisotropy to the bulk magnet or the magnetic powder and which may be used, area hot pressing and pulverizing process (see Japanese Patent Publication No. 4-20242) which comprises sintering an alloy powder produced by a rapid solidification process at a low temperature by a hot press or the like, and pulverizing the bulk magnet having a magnetic anisotropy provided by a die upsetting treatment; a pack rolling process (see Japanese Patent No. 2596835) which comprises filling an alloy powder produced by a rapid solidification process, as it is, into a vessel made of a metal to provide a magnetic anisotropy to the alloy powder by a plastic working such as a hot rolling; an ingot hot pressing and pulverizing process (Japanese Patent Publication No. 7-66892) which comprises subjecting an alloy ingot to a hot plastic working and then pulverizing the resulting ingot to produce a magnetic powder having a magnetic anisotropy; and an HDDR process (see Japanese Patent Publication No. 6-82755) which comprises heating a rare earth metal-based permanent magnet alloy in a hydrogen atmosphere to occlude hydrogen, subjecting the magnetic alloy to a dehydrogenating treatment and cooling the resulting alloy, thereby producing a magnetic powder.

The process for providing the magnetic anisotropy is not limited to those using the combinations of the starting alloys and the anisotropy providing means, and various proper combinations can be used.

Examples of the compositions of the magnetic powders produced by the above-described processes are a composition comprising 8% by atom to 30% by atom of R (R is at least one of rare earth elements including Y, desirably, of light rare earth elements such as Nd, Pr as a main component and the like, or a mixture of at least one of rare earth elements with Nd, Pr or the like), 2% by atom to 28% by atom of B (a portion of B may be substituted by C), and 65% by atom to 84% by atom of Fe (a portion of Fe may be substituted by at least one of Co in an amount of 50% or less of Fe and Ni in an amount of 8% or less of Fe).

To increase the coercive force and the corrosion resistance of the bonded magnet, at least one of the following elements may be incorporated into the starting powder: 3.5% by atom or less of Cu, 2.5% by atom or less of S, 4.5% by atom or less of Ti, 15% by atom or less of Si, 9.5% by atom or less of V, 12.5% by atom or less of Nb, 10.5% by atom or less of Ta, 8.5% by atom or less of Cr, 9.5% by atom or less of Mo, 9.5% by atom or less of W, 3.5% by atom or less of Mn, 9.5% by atom or less of Al, 2.5% by atom or less of Sb, 7% by atom or less of Ge, 3.5% by atom or less of Sn, 5.5% by atom or less of Zr, 5.5% by atom or less of Hf, 8.5% by atom or less of Ca, 8.5% by atom or less of Mg, 7% by atom or less of Sr, 7% by atom or less of Ba, 7% by atom or less of Be and 10% by atom or less of Ga.

For the magnetic powder for an Nd—Fe—B based nanocomposite magnet, it is desirable to select a composition in a range comprising 1% by atom to 10% by atom of R, 5% by atom to 28% by atom of B and the balance comprising substantially Fe.

When a resinous binder is used as a binder for producing a bonded magnet, a resin suitable for each of the molding processes may be used. For example, examples of the resins suitable for a compression molding process are an epoxy resin, a phenol resin, diallyl phthalate and the like. Examples of the resins suitable for an injection molding process are 6-nylon, 12-nylon, polyphenylene sulfide, polybutylene phthalate and the like. Examples of the resins suitable for an extrusion process and a rolling process are polyvinyl chloride, an acrylonitrile-butadiene rubber, chlorinated polyethylene, natural rubbers, Hypalon and the like.

Various processes for producing a bonded magnet are known, and examples of the processes commonly used are an injection molding process, an extruding process, a rolling process and the like in addition to a compression molding process which comprises mixing a magnetic powder, a resinous binder and as required, a silane-based or titanium-based coupling agent, a lubricant for facilitating the molding, and a binding agent for a resin and an inorganic filler in required amounts to knead the mixture, subjecting the mixture to a compression molding, and heating the resulting material to cure the resin.

The present invention is also applicable to a sintered magnet. As in the above-described bonded magnets, examples of the sintered magnets are an R—Fe—B based sintered magnet, typical of which is an Nd—Fe—B based sintered magnet, an R—Fe—N based sintered magnet, typical of which is an Sm—Fe—B based sintered magnet, and the like.

A magnetic powder which is a starting material for the sintered magnet can be produced by a process similar to that for producing the magnetic powder for forming the bonded magnet, e.g., a dissolution and milling process and a reduction and diffusion process and the like which are conventionally employed. In addition to these processes, particularly, a sintered magnet having a high magnetic characteristic can be produced using a magnetic powder which is produced by pulverizing a thin alloy plate having a columnar crystal structure grown in a thickness-wise direction by a molten metal quenching process, and which is described in Japanese Patent No. 2665590.

The composition of the magnetic powder which is a starting material for the sintered magnet can be selected in a range substantially similar to that of the magnetic powder for forming the bonded magnet.

The sintered magnet can be easily produced by employing the known powder metallurgical process. The provision of an anisotropy can be realized by molding a magnetic powder having a magnetic anisotropy in an oriented manner in the presence of a magnetic field.

Even in these sintered magnets, the effect of the present invention is not varied depending on the composition of the magnetic powder as the starting material and the isotropy and anisotropy of the sintered magnet, and an intended effect can be obtained, as in the bonded magnet.

Examples of the fine metal powders used in the present invention are fine powders of Cu, Fe, Ni, Co, Cr, Sn, Zn, Pb, Cd, In, Au, Ag, Al and the like. Among others, a fine Cu powder is desirable in respect of the cost and an easy to conduct an electroplating treatment from the view point of the provision of an electric conductivity to the work using a fine metal powder for carrying out the electroplating treatment. An oxide film can be formed on a film layer made of an fine Al powder to provide an excellent rust proof effect. Therefore, when a simplified rust proof effect is expected, the fine Al powder is desirable.

The fine metal powder may comprise a single metal component, or an alloy containing two or more metal components. The fine metal powder may comprise an alloy containing these metal components as main components and another metal component. When such an alloy is used, it is desirable to select an appropriate combination of the metal components depending on, for example, a required ductility. The fine metal powder may contain impurities inevitable in the industrial production.

Examples of the fine metal powder producing materials as a source for producing a fine metal powder, which may be used, are a metal piece made of only a desired metal, and a composite metal piece comprising a desired metal coated on a core material made of a different metal. These metal pieces have a variety of shapes) such as a needle-like shape (wire-like shape), a columnar shape, a massive shape and the like. However, it is desirable to use a metal piece with a sharp end, for example, a metal piece having a needle-like shape and a metal piece having a columnar shape, from the viewpoints of the purpose of efficiently producing a fine metal powder or the like. Such a desirable shape can be easily provided by employing a known wire cutting technique.

The size (longer diameter) of the fine metal powder producing material is desirable to be in a range of 0.05 mm to 10 mm, more desirable to be in a range of 0.3 mm to 5 mm, further desirable to be in a range of 0.5 mm to 3 mm from the viewpoints of the purpose of efficiently producing a fine metal powder or the like. The fine metal powder producing material, which may be used, is a material having the same shape and the same size, and a mixture of materials having different shapes and different sizes.

An embodiment of the surface treatment process according to the present invention will now be described with reference to the accompanying drawings, but the present invention is not limited to the contents described hereinafter.

Figure 2:
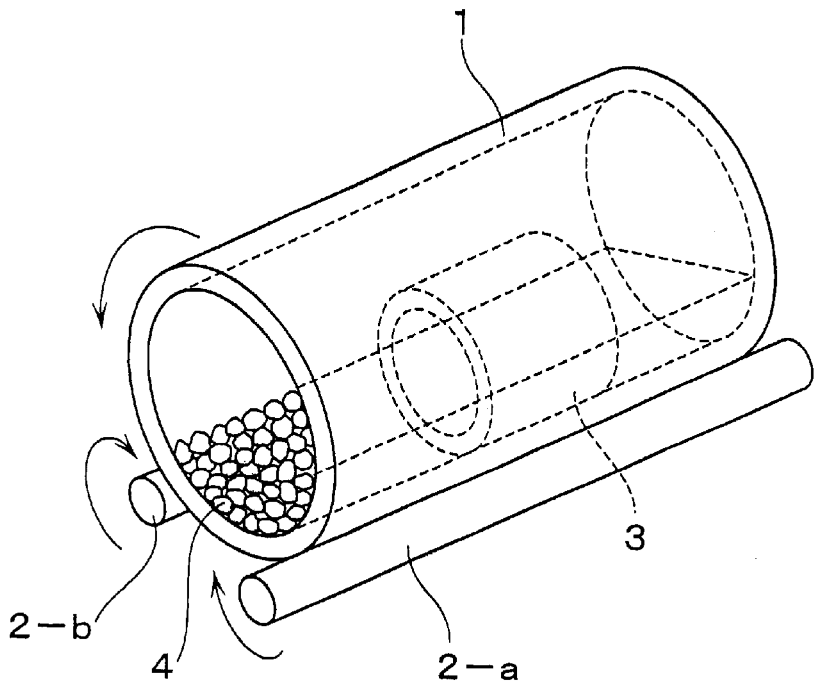
FIG. 2 is a partially perspective view of one example of an apparatus used in the surface treatment process of the present invention.

FIG. 2 shows, in a partially perspective view, one example of an apparatus used in the surface treatment process according to the present invention. The apparatus shown in FIG. 2 is intended to rotate a cylindrical treating vessel (which will be referred simply to as a vessel hereinafter) 1 about a center axis thereof. Two rollers 2-*a* and 2-*b* as a rotating means are rotated in the same direction using a device for a rotated-type ball mill apparatus which is not shown.

The surface treatment process according to the present invention is not limited to the above-described mode, but the treating vessel is desirable to be cylindrical, particularly, in respect of the fact that the fine metal powder producing material can be brought efficiently and uniformly into flowing contact with the inner surface of the work. In addition, to bring the fine metal powder producing material into flowing contact with the surface of the work, it is desirable to rotate the cylindrical treating vessel, and in particular, it is desirable to rotate the vessel about its center axis.

The vessel 1 may be made of a metal or a resin, but it is desirable to use a vessel made of the same metal as a metal forming a fine metal powder desired to be adhered to a surface of a work 3 such as a ring-shaped rare earth metal-based permanent magnet. This is because even if a fine powder is produced from the vessel itself due to the collision of the contents of the vessel against an inner surface of the vessel, such fine powder is not an impurity with respect to the contents of the vessel, if the metal forming the vessel is the same as the metal forming the fine metal powder.

It is desirable that the work 3 is placed into the vessel 1, so that the center axis of the work 3 is parallel to the center axis of the vessel 1, as shown in FIG. 2. FIG. 2 shows the single work 3 placed in the vessel, but of course, two or more works may be placed side-by-side into the vessel. If a plurality of works are placed side-by-side into the vessel, the collision of the works against one another can be inhibited by an effect of side-by-side arrangement of the works, thereby preventing the roughening of the surfaces of the works and in addition, an excellent effectiveness is provided in respect of an efficiency of loading in a given space. Further, a plurality of works having different diameters may be placed in a piled-up manner (i.e., in such a manner that a smaller work is placed into a hole in a larger work).

Figure 3:
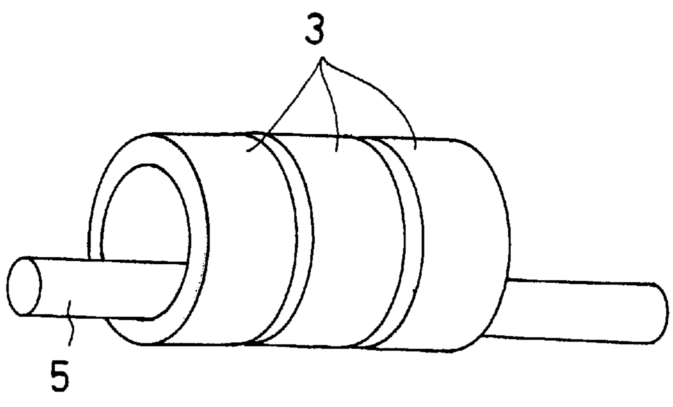
FIG. 3 is a view showing how to dispose a rod-shaped member in a work according to the present invention.

In placing the work(s) 3 into the vessel 1, it is desirable that a rod-shaped member 5 is inserted through and disposed in the through-hole in the work 3, so that it is parallel to the center axis of the work 3 (see FIG. 3). The behavior of the work in the vessel can be tranquillized by the presence of the rod-shaped member and hence, the collision of the works against one another can be inhibited, leading to an effect of preventing the roughening of the surfaces of the works. The rod-shaped member may be made of a metal or a resin, but it is desirable that the rod-shaped member is made of the same metal as the metal forming the fine metal powder desired to be adhered to the surface of the work.

When the vessel 1 is rotated about its center axis by the two rollers 2-*a* and 2-*b* (see arrows in FIG. 2), the fine metal powder producing material 4 is permitted to flow in the same direction as the direction of rotation of the vessel with respect to the work 3. As a result, a fine metal powder is produced from the fine metal powder producing material by the contact of the fine metal powder producing material with the surface of the work and with the inner surface of the vessel and by the contact of pieces of the fine metal powder producing material with one another. The produced fine metal powder is adhered to the surface of the work by the contact with the surface of the work in a flowing state. In particular, the fine metal powder produced from the fine metal powder producing material flowing within the through-hole in the work is brought in a flowing state into contact with the inner surface of the work. This is convenient for adhesion of the fine metal powder to the inner surface of the work.

The rotational speed of the vessel is desirable to be equal to or higher than 50 rpm, in respect of that the fine metal powder producing material is brought efficiently and uniformly into flowing contact with the surface of the work. As the rotational speed is increased, the amount of fine metal powder adhered to the inner surface is increased, because the fine metal powder producing material located within the through-hole in the work and the produced fine metal powder are brought efficiently into flowing contact with the inner surface of the work.

However, if the vessel is rotated at an excessive rotational speed when the work is a bonded magnet, there is a possibility that some of particles in the magnetic powder may be removed, or the adhered fine metal powder may be peeled off due to the violent contact with the contents of the vessel and with the inner surface of the vessel. Therefore, the rotational speed of the vessel is desirable to be equal to or lower than 300 rpm.

It is desirable that the amount of the fine metal powder producing material placed into the vessel is in a range of 10% by volume (inclusive) to 90% by volume (inclusive) of the internal volume of the vessel. This is because if the amount is smaller than 10% by volume, there is a possibility that an amount of the fine metal powder enough to be adhered to the surface of the work is not produced, and on the other hand, if the amount exceeds 90% by volume, there is a possibility that the fine metal powder producing material is not brought efficiently into flowing contact with the surface of the work.

When the surface treatment process according to the present invention is utilized for the surface treatment of a ring-shaped rare earth metal-based permanent magnet using a fine metal powder producing material, it is desirable that the process is carried out in a dry manner in consideration of the fact that both of the ring-shaped rare earth metal-based permanent magnet and the fine metal powder producing material are liable to be oxidized.

The treating time depends on the throughput, but is generally in a range of about 1 hour to about 15 hours.

Figure 4:
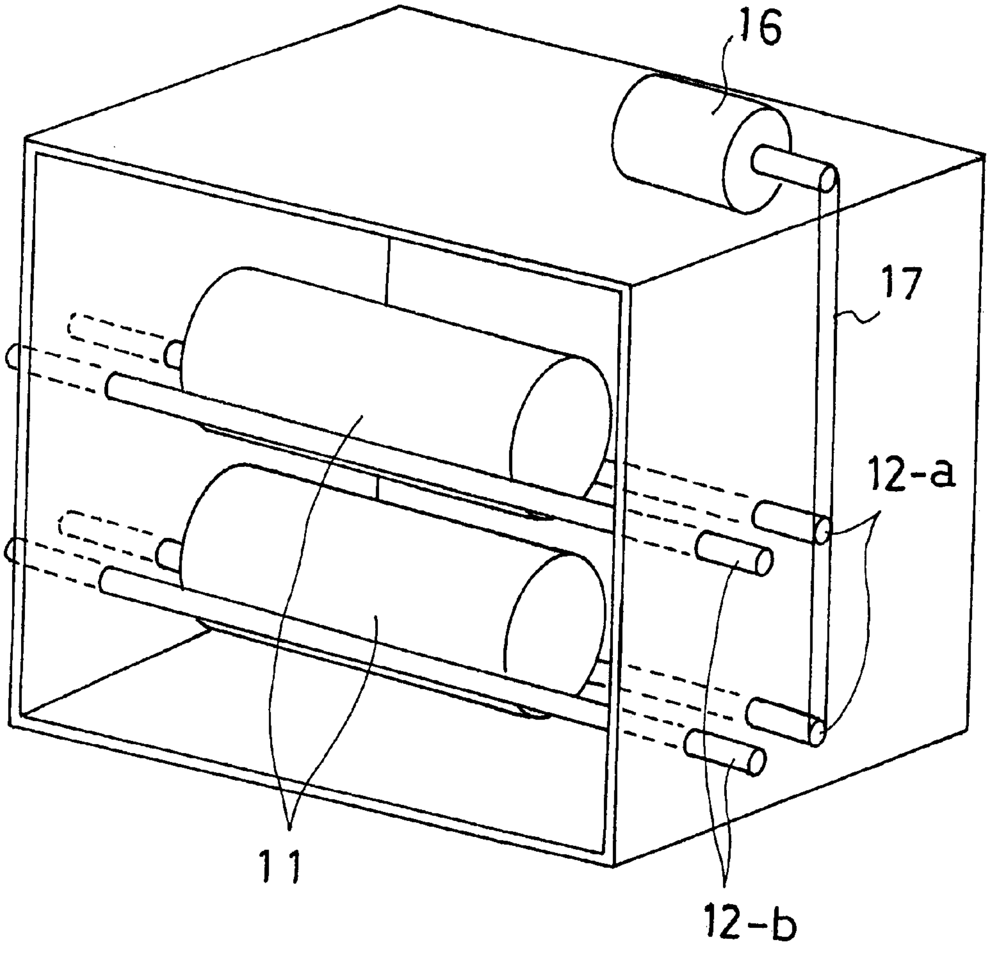
FIG. 4 is a schematic view of one example of a mass-treatment apparatus used in the surface treatment process of the present invention.

One example of a mass-treatment apparatus used in the surface treatment process according to the present invention is shown in a schematic view in FIG. 4. In this apparatus, the cylindrical treating vessels 11 are rotated about their center axes by rotating the rollers 12-*a* through a belt 17 by a motor 16 placed in an upper portion of the apparatus. Each of the rollers 12-*b* is a follower roller and rotatably mounted to a side plate of the apparatus.

Figure 5:
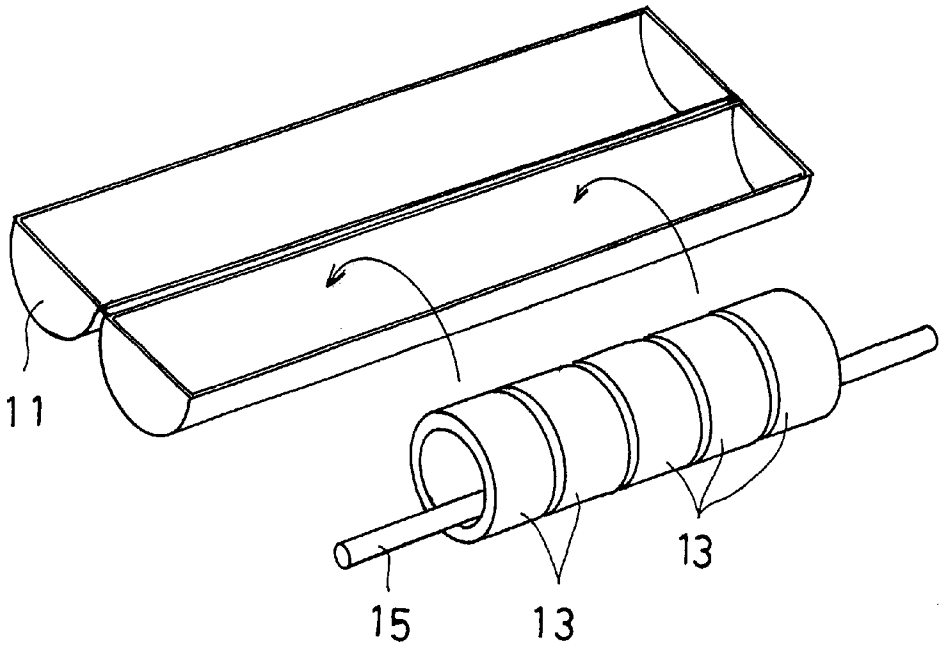
FIG. 5 is a view showing how to place a work into a cylindrical treating vessel according to the present invention.

FIG. 5 is a view showing how to place the work into the cylindrical treating vessel 11. The vessel 11 is capable of being opened and closed through a hinge. The work 13 with the rod-shaped member 15 inserted through and disposed in the through-hole therein is placed into the vessel 11 which is in an opened state as shown in FIG. 5 and has a fine metal powder producing material (notshown) contained therein, and then, the vessel is closed, thus setting the apparatus shown in FIG. 4.

To bring the fine metal powder producing material into flowing contact with the surface of the work, various modes which will be described below may be used in place of the above-described mode in which the cylindrical vessel is rotated: A single cylindrical treating vessel or a plurality of cylindrical treating vessels having contents, namely, a work and a fine metal powder producing material contained therein may be placed into a cylindrical treating vessel having a larger inside diameter, and both of the vessels may be rotated. In addition, the contents of the cylindrical treating vessels may be vibrated and/or agitated. The vibration and/or agitation of the contents of the cylindrical treating vessel can be achieved, for example, by placing the cylindrical treating vessel having the contents contained therein into a treating vessel in a barrel finishing machine or a vibrated ball mill apparatus. In the above-described mode in which the cylindrical treating vessel is rotated, the contents of the cylindrical treating vessel may be vibrated and/or agitated simultaneously with the rotation of the treating vessel, for example, by use of rollers provided with projections. Further, a barrel finishing machine or a vibrated ball mill apparatus may be used as a treating vessel, and the work and the fine metal powder producing material may be placed directly into a treating vessel in the barrel finishing machine or the vibrated ball mill apparatus, whereby the work may be treated. The barrel finishing machine may be a conventional machine of a rotated-type, a vibrated-type, a centrifugal-type or another type. In the case of the rotated-type, it is desirable that the rotational speed is in a range of 20 rpm to 200 rpm. In the case of the vibrated-type, it is desirable that the vibration frequency is in a range of 50 Hz to 100 Hz, and the vibration amplitude is in a range of 0.3 mm to 10 mm. In the case of the centrifugal-type, it is desirable that the rotational speed is in a range of 70 rpm to 200 rpm.

With the surface treatment process according to the present invention, the fine metal powder can be adhered firmly and at a high density to the entire surface of the work, i.e., not only to the outer surface but also to the inner surface of the work. Therefore, it is possible to carry out that surface treatment of the inner surface of a work having a large L/D value (wherein L represents a length of the work in a direction of a center axis of the work, and D represents an inside diameter of the work) (see FIG. 1*a*), which has been difficult hitherto. Particularly, when the surface treatment of the inner surface of a work having an L/D value equal to or larger than 1 is to be carried out, it is desirable that the treating vessel rotating mode is used as the measure for bringing the fine metal powder producing material into flowing contact with the surface of the work.

The surface treatment process according to the present invention is applied to a ring-shaped rare earth metal-based permanent magnet, the fine metal powder can be adhered uniformly to the entire surface of the magnet, i.e., not only to the outer surface but also to the inner surface of the magnet. Moreover, the thus-adhered fine metal powder has been adhered firmly and at a high density to the entire surface and hence, the film layer made of the fine metal powder cannot be removed by a force of such a degree that the surface is rubbed by a hand. Therefore, even when the work having the film layer will be subjected later to the electroplating treatment, the fine metal powder cannot be peeled off and dropped before the carrying-out of the electroplating treatment and hence, a plated film having a high adhesion strength can be formed.

The reason why the fine metal powder can be adhered to the magnet in the above manner is believed to be that a mechanochemical reaction, which is a specific surface-chemical reaction caused by a pure metal surface (a fresh surface) which is not oxidized, participates in such adhesion.

In other words, the fine metal powder is produced from the fine metal powder producing material by bringing the fine metal powder producing material into flowing contact with the surface of the magnet, and the fine metal powder as just produced is not oxidized and has the fresh surface, which is advantageous for causing the mechanochemical reaction.

When a fine metal powder producing material having a sharp end, for example, a fine metal powder producing material having a needle-like shape or a fine metal powder producing material having a columnar shape is used, a fresh surface can be produced efficiently even on a metal forming the surface of a magnet (i.e., in addition to a magnetic powder existing in the surface of a bonded magnet, a metal filler existing in the surface of a bonded magnet produced using a binder including the metal filler, a magnetic crystal phase existing in the surface of a sintered magnet, and the like) by bringing the fine metal powder producing material into flowing contact with the surface of the magnet. Therefore, it is believed that the reactivity between the surface of the magnet and the fine metal powder is enhanced.

Further, when the surface treatment process according to the present invention is applied to a bonded magnet, it is believed that the penetration of the produced fine metal powder into an already-cured resin portion of the surface of the magnet also works conveniently for the adhesion of the fine metal powder on the entire surface of the magnet.

It has been made cleared from the studies made by the present inventors that even if a commercially available fine metal powder is placed into the treating vessel, in place of the fine metal powder producing material, and the surface treatment is carried out in the same manner as that described above, it is difficult to adhere the fine metal powder to the surface of the magnet. The reason is believed to be as follows: The commercially available fine metal powder usually has an oxidized surface and does not have a fresh surface and in addition, does not have a sharp end. For this reason, even if the fine metal powder is brought into flowing contact with the surface of the magnet, a fresh surface cannot be produced on a metal forming the surface of the magnet and cannot be also produced on the fine metal powder itself and hence, the mechanochemical reaction does not occur efficiently.

However, if the commercially available fine metal powder is placed in combination with the fine metal powder producing material into the treating vessel, a fresh surface can be produced even on the commercially available fine metal powder and hence, it is expected that the commercially available fine metal powder also contributes to the formation of a film layer.

The fine metal powders produced from the fine metal powder producing material are of various sizes and shapes, but in general, a ultra-fine powder (particles having a longer diameter in a range of 0.001 $\mu$m to 0.1 $\mu$m) is advantageous to cause the mechanochemical reaction, and in this case, a firm and high-dense film layer having a thickness in a range of 0.001 $\mu$m to 1 $\mu$m is formed on the metal forming the surface of the magnet.

When the present invention is applied to the bonded magnet, the relatively large particles (particles having a longer diameter on the order of 5 $\mu$m) of the fine metal powder produced are press-fitted into an already-cured resin portion of the surface of the magnet, and a portion protruding on the resin is deformed into a shape covering the resin surface by the collision against the contents of the treating vessel to contribute to the formation of the film layer covering the entire surface of the resin. These actions cooperate to form a film layer made of the fine metal powder uniformly and firmly on the entire surface of the magnet. As a result, an electrically conductive layer can be provided uniformly and firmly on the entire surface of the magnet.

With the ring-shaped rare earth metal-based permanent magnet having an electric conductivity provided to both of the outer and inner surfaces thereof by the above-described process, a plated film can be formed at a high thickness accuracy on the surface of such magnet, for example, by a known electroplating treatment, thereby producing a magnet having an excellent corrosion resistance. A typical electroplating process is a process using at least one metal selected from the group consisting of Ni, Cu, Sn, Co, Zn, Cr, Ag, Au, Pb and Pt, or an alloy of a combination of some of these metals (which may include any of B, S and P). A plating process using an alloy containing at least one or some of the above-described metals and any of other metals may be employed depending on an application. The thickness of the plated film is equal to or smaller than 50 $\mu$m, desirably, in a range of 10 $\mu$m to 30 $\mu$m.

When the Ni electroplating treatment is to be carried out, it is desirable that a washing step, an Ni electroplating step, a washing step and a drying step are conducted in the named order. Any of various plating bath tanks may be used depending on the shape of a magnet, and for example, a rack plating type or a barrel plating type can be used. A known plating bath may be used such as a Watt's bath, a sulfamate acid bath and a Wood's bath. An electrolytic Ni plate is used as an anode, but it is desirable that an S-containing estrand nickel chip is used as the electrolytic Ni plate in order to stabilize the elution of nickel (Ni). Alternatively, a nickel rod connected to an anode may be inserted through and disposed in the through-hole in the magnet.

In addition to the plated film, any of various corrosion-resistant film, e.g., a metal oxide film or a chemical conversion coating film can be formed on the film layer made of the fine metal powder. The formation of such a film can be achieved at a high thickness accuracy, because the film layer has been formed uniformly and firmly on the entire surface of the magnet.

EXAMPLES

Example 1

An epoxy resin was added in an amount of 2% by weight to an alloy powder made by a rapid solidification process and having an average particle size of 150 μm and a composition comprising 12% by atom of Nd, 77% by atom of Fe, 6% by atom of B and 5% by atom of Co, and the mixture was kneaded. The resulting material was subjected to a compression molding under a pressure of 686 $N/mm^2$ and then cured at 170° C. for 1 hour, thereby producing a ring-shaped bonded magnet having an outside diameter of 22 mm, an inside diameter of 20 mm and a length of 6.5 mm (an L/D value of 0.33). This magnet was used for an experiment which will be described below.

The seven ring-shaped bonded magnets were placed into a cylindrical vessel made of copper (Cu) and having an inside diameter of 32 mm and a length of 50 mm, so that their center axes were parallel to a center axis of the cylindrical vessel. Further, a pipe of copper having a diameter of 8 mm and a length of 45 mm was inserted as a rod-shaped member through and disposed in a through-hole in the magnet. A fine Cu powder producing material comprising short columnar pieces (which was made by cutting a wire and which will be referred to as media hereinafter) having a diameter of 0.6 mm and a length of 0.6 mm was placed into the cylindrical vessel in an amount of 50% by volume of the internal volume of the cylindrical vessel. Then, the vessel was rotated about its center axis at a rotational speed of 100 rpm by use of a rotated-type ball mill apparatus.

Figure 6:
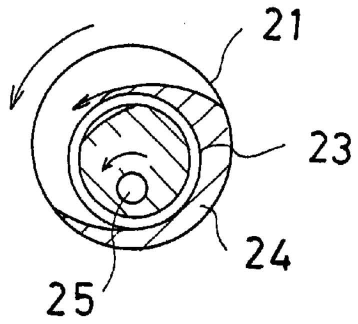
FIG. 6 is a diagram showing the behavior of the contents of the vessel used in the present invention as observed from the end face of the vessel.

The behavior of the contents of the vessel as observed from the end face of the vessel (one of the end faces is made of a transparent acrylic resin) is shown diagrammatically in FIG. 6. The variation in amount of fine Cu powder adhered to the outer and inner surfaces of the magnet with the passage of time was examined after lapses of 2 hours, 4 hours and 6 hours from the start of the treatment by a Cu fluorescence X-ray strength measurement (an apparatus used was SFT-7100 made by Seiko Instruments and Electronics, Ltd.). Results are shown in FIG. 7.

In the observation of the behavior of the contents of the vessel, the magnet 23 was rotated at a low rotational speed in the direction of rotation of the vessel 21, as shown in FIG. 6. The media 24 outside the magnet were brought into flowing contact with the outer surface of the magnet in the direction of rotation of the vessel to such an extent that they did not wrap the magnet. The media within the through-hole in the magnet were brought into flowing contact with the inner surface of the magnet in the through-hole in the direction of rotation of the vessel. The magnet could not be moved violently within the vessel due to the presence of the pipe of copper 25, so that the behavior thereof was tranquillized.

Figure 7:
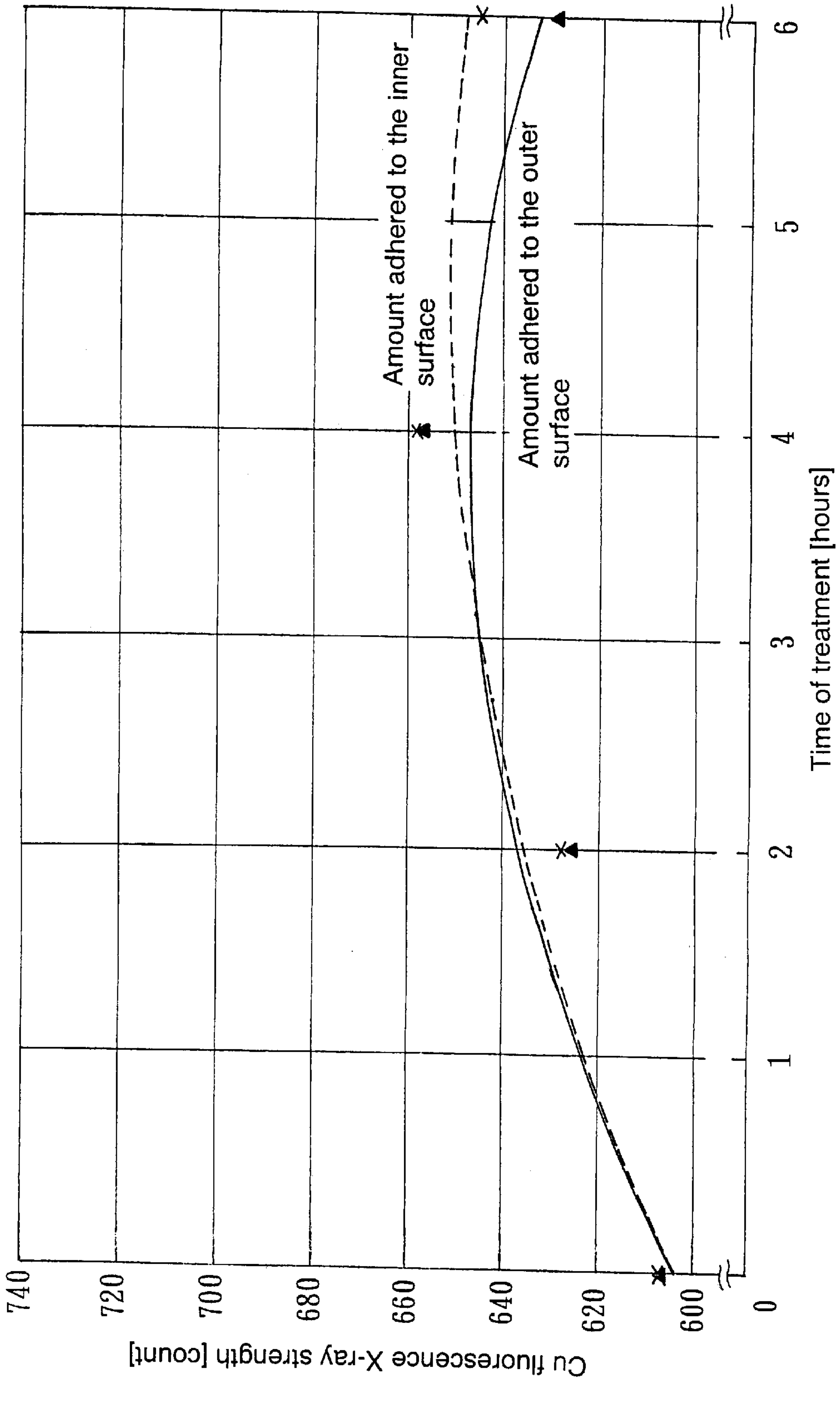
FIG. 7 is a graph showing the relationship between the time of treatment of the magnet according to the present invention and the Cu fluorescence X-ray strength.

For a period of about 4 hours from the start of the treatment, both of the amounts of fine Cu powder adhered to the outer and inner surfaces were increased in substantially similar increments, as shown in FIG. 7. Thereafter, the amount of fine Cu powder adhered to the outer surface was decreased, and this phenomenon was considered to be due to the fact that some of fine Cu powder-adhered particles in the magnetic powder were dropped by the collision against the contents of the vessel.

Example 2

The treatment, the observation and the measurement were carried out in the same manner as in Example 1, except that the rotational speed was set at 150 rpm. Results are shown in FIGS. 8 and 9.

Figure 8:
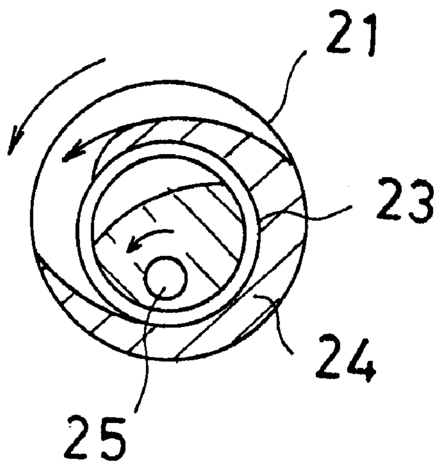
FIG. 8 is a diagram showing the behavior of the contents of the vessel as observed from the end face of the vessel under another condition according to the present invention.

In the observation of the behavior of the contents of the vessel, the magnet 23 was rotated at a rotational speed higher than that in the Example 1 in the direction of rotation of the vessel 21, as shown in FIG. 8. Because the rotational speed of the vessel was increased, the media within the through-hole in the magnet were moved out of the through-hole and hence, the amount of the media 24 present outside the magnet was increased. As a result, the media were brought into flowing contact with the outer surface of the magnet so as to wrap the magnet. The media within the through-hole in the magnet were brought into flowing contact with the inner surface of the magnet in the through-hole in the direction of rotation of the vessel.

Figure 9:
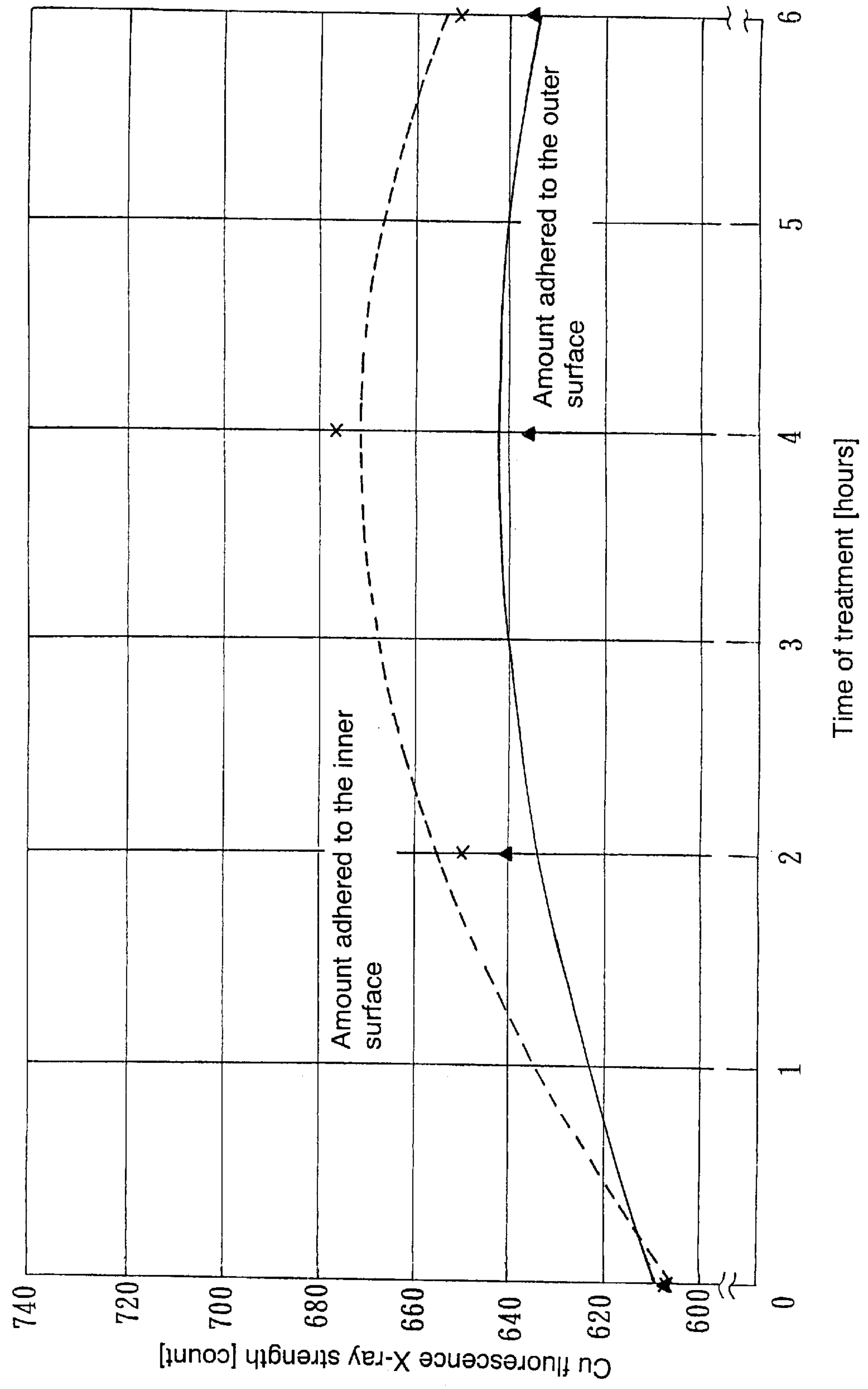
FIG. 9 is a graph showing the relationship between the time of treatment of the magnet under the other condition according to the present invention and the Cu fluorescence X-ray strength.

The amount of fine Cu powder adhered to the outer surface of the magnet was as large as that in Example 1, but the amount of fine Cu powder adhered to the inner surface of the magnet was larger than that in Example 1 and the speed of adhesion of the fine Cu powder to the inner surface of the magnet was also higher than that in Example 1, as shown in FIG. 9. This was considered to be because the increased rotational speed of the vessel caused the media and the produced fine Cu powder to be brought efficiently into flowing contact with the inner surface of the magnet, and as a result, the mechanochemical reaction occurred effectively.

Example 3

The treatment, the observation and the measurement were carried out in the same manner as in Example 1, except that the rotational speed was set at 175 rpm. Results are shown in FIGS. 10 and 11.

Figure 10:
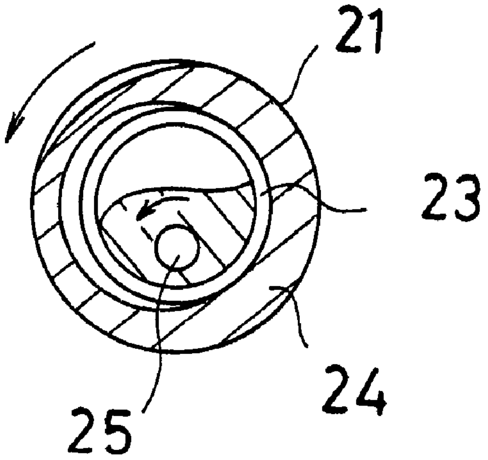
FIG. 10 is a diagram showing the behavior of the contents of the vessel as observed from the end face of the vessel under a further condition according to the present invention.

In the observation of the behavior of the contents of the vessel, because the rotational speed of the vessel 21 was increased, the media 24 were forced to the outside of the magnet 23, and the magnet was rotated synchronously with the media crowded outside the magnet, as shown in FIG. 10.

Figure 11:
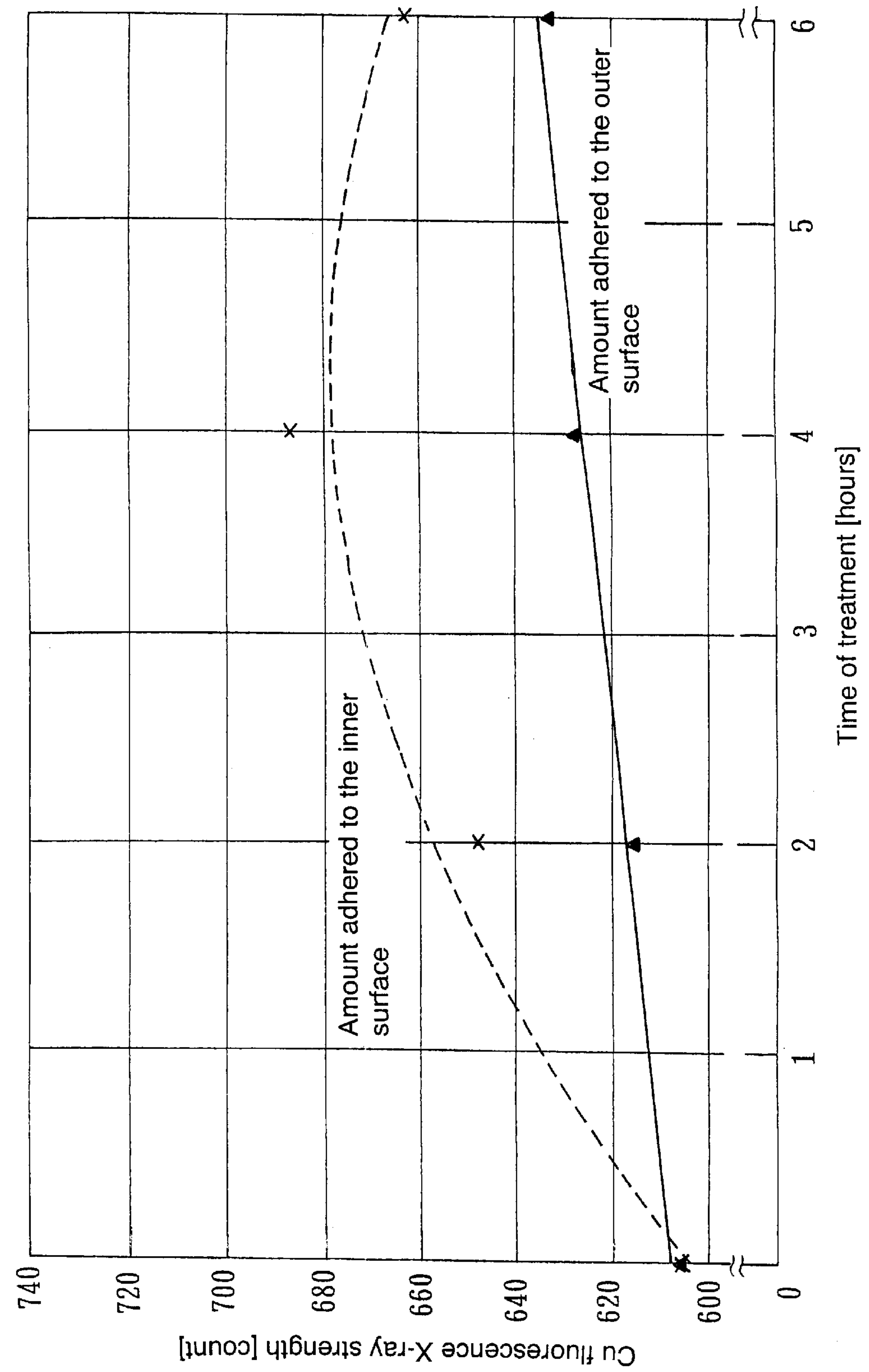
FIG. 11 is a graph showing the relationship between the time of treatment of the magnet under the further condition according to the present invention and the Cu fluorescence X-ray strength.

The amount of fine Cu powder adhered to the outer surface of the magnet was decreased less than those in Examples 1 and 2, but the amount of fine Cu powder adhered to the inner surface of the magnet was increased more than that in Example 2, as shown in FIG. 11. This was considered to be because the mechanochemical reaction was difficult to occur on the outer surface of the magnet, while the mechanochemical reaction occurred more effectively on the inner surface of the magnet, due to the degraded flowability of the media relative to the outer surface of the magnet.

Example 4

The treatment, the observation and the measurement were carried out in the same manner as in Example 1, except that the rotational speed was set at 200 rpm. Results are shown in FIGS. 12 and 13.

Figure 12:
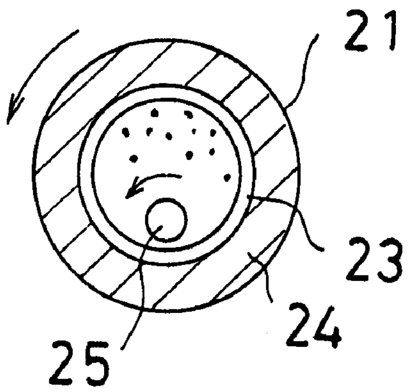
FIG. 12 is a diagram showing the behavior of the contents of the vessel as observed from the end face of the vessel under a yet further condition according to the present invention.

In the observation of the behavior of the contents of the vessel, because the rotational speed of the vessel 21 was increased higher than that in Example 3, most of the media 24 were forced to the outside of the magnet 23, and the flowability of the media relative to the outer surface of the magnet was further degraded, as shown in FIG. 12. On the other hand, a small number of the media were brought at a high speed into flowing contact with the inner surface of the magnet in the through-hole in the magnet.

Figure 13:
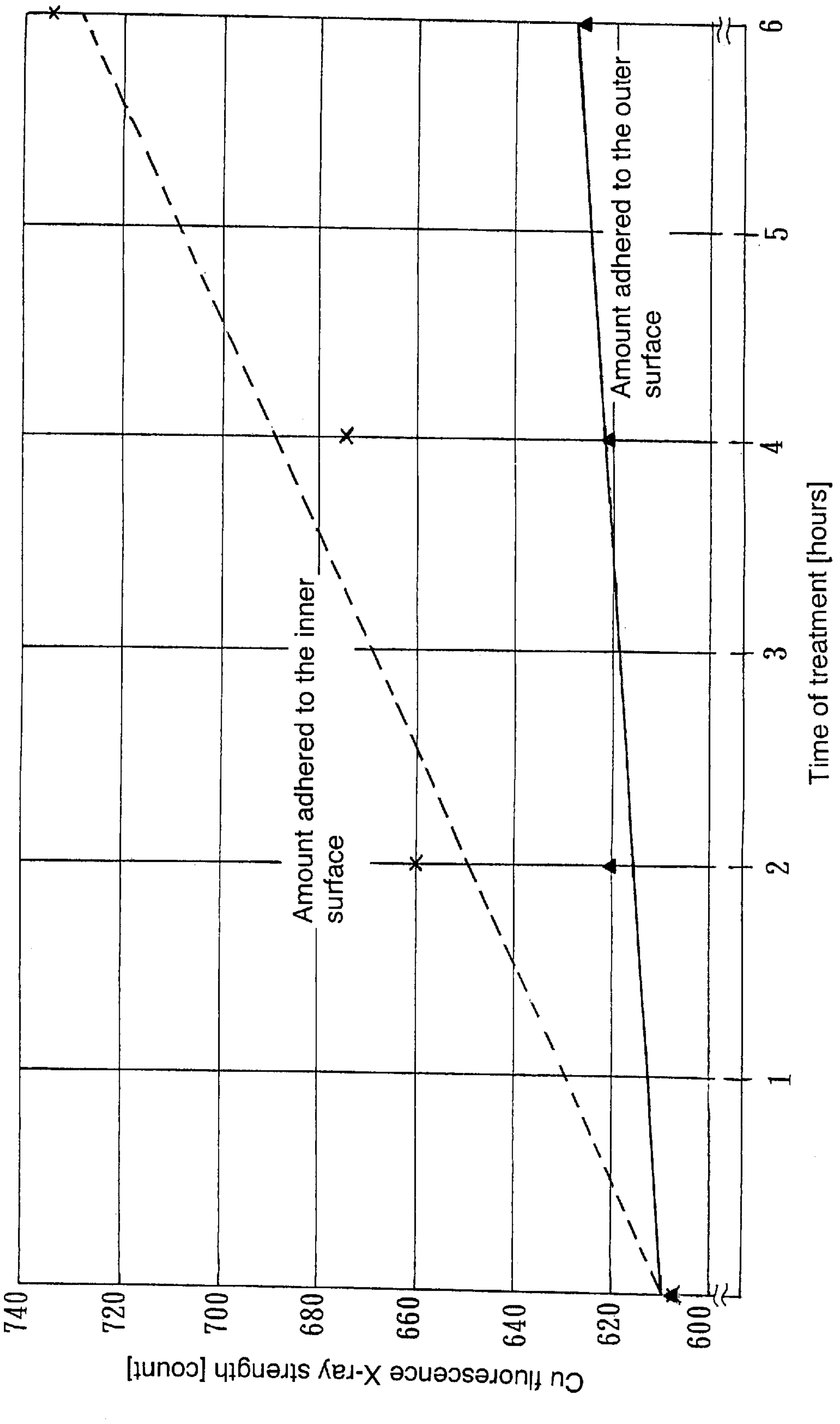
FIG. 13 is a graph showing the relationship between the time of treatment of the magnet under the yet further condition according to the present invention and the Cu fluorescence X-ray strength.

The amount of fine Cu powder adhered to the outer surface of the magnet was decreased less than that in Example 3, but the amount of fine Cu powder adhered to the inner surface of the magnet was increased more than that in Example 3, as shown in FIG. 13.

It was found from Examples 1 to 4 that the higher the rotational speed of the vessel, the larger the amount of fine Cu powder adhered to the inner surface of the magnet was increased. It was also found that the amounts of fine cu powder adhered to the outer and inner surfaces could be controlled by a two-stage treatment process comprising a step of treatment at a rotational speed of 150 rpm and a step of treatment at a rotation speed of 200 rpm.

Example 5

The seven same ring-shaped bonded magnets as in Example 1 were placed into a cylindrical vessel made of copper (Cu) and having an inside diameter of 32 mm and a length of 50 mm, so that their center axes were parallel to a center axis of the cylindrical vessel. Further, a pipe of copper having a diameter of 8 mm and a length of 45 mm was inserted through and disposed in a through-hole in the magnet. A fine Cu powder producing material comprising short columnar pieces (which was made by cutting a wire and which will be referred to as media hereinafter) having a diameter of 0.6 mm and a length of 0.6 mm was placed into the cylindrical vessel in an amount of 70% by volume of the internal volume of the cylindrical vessel. Then, the vessel was rotated about its center axis at rotational speeds of 100 rpm, 150 rpm, 175 rpm and 200 rpm by use of a rotated-type ball mill apparatus. The behavior of the contents of the vessel under each of the conditions was observed from the end face of the vessel (one of the end faces is made of a transparent acrylic resin), and the variation in amount of fine Cu powder adhered to the outer and inner surfaces of the magnet with the passage of time was examined after lapses of 2 hours, 4 hours and 6 hours from the start of the treatment by a Cu fluorescence X-ray strength measurement.

As a result, when the rotational speed was of from 100 rpm to 175 rpm, the media were in a state in which they were crowded both outside the magnet and in the through-hole in the magnet, resulting in a poor flowability and moreover, the magnet was rotated synchronously with the media. Therefore, the fine Cu powder was little adhered to either the outer and inner surface of the magnet.

Figure 14:
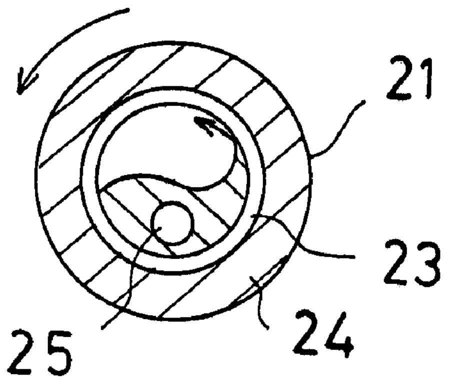
FIG. 14 is a diagram showing the behavior of the contents of the vessel as observed from the end face of the vessel under a yet further condition according to the present invention.
Figure 15:
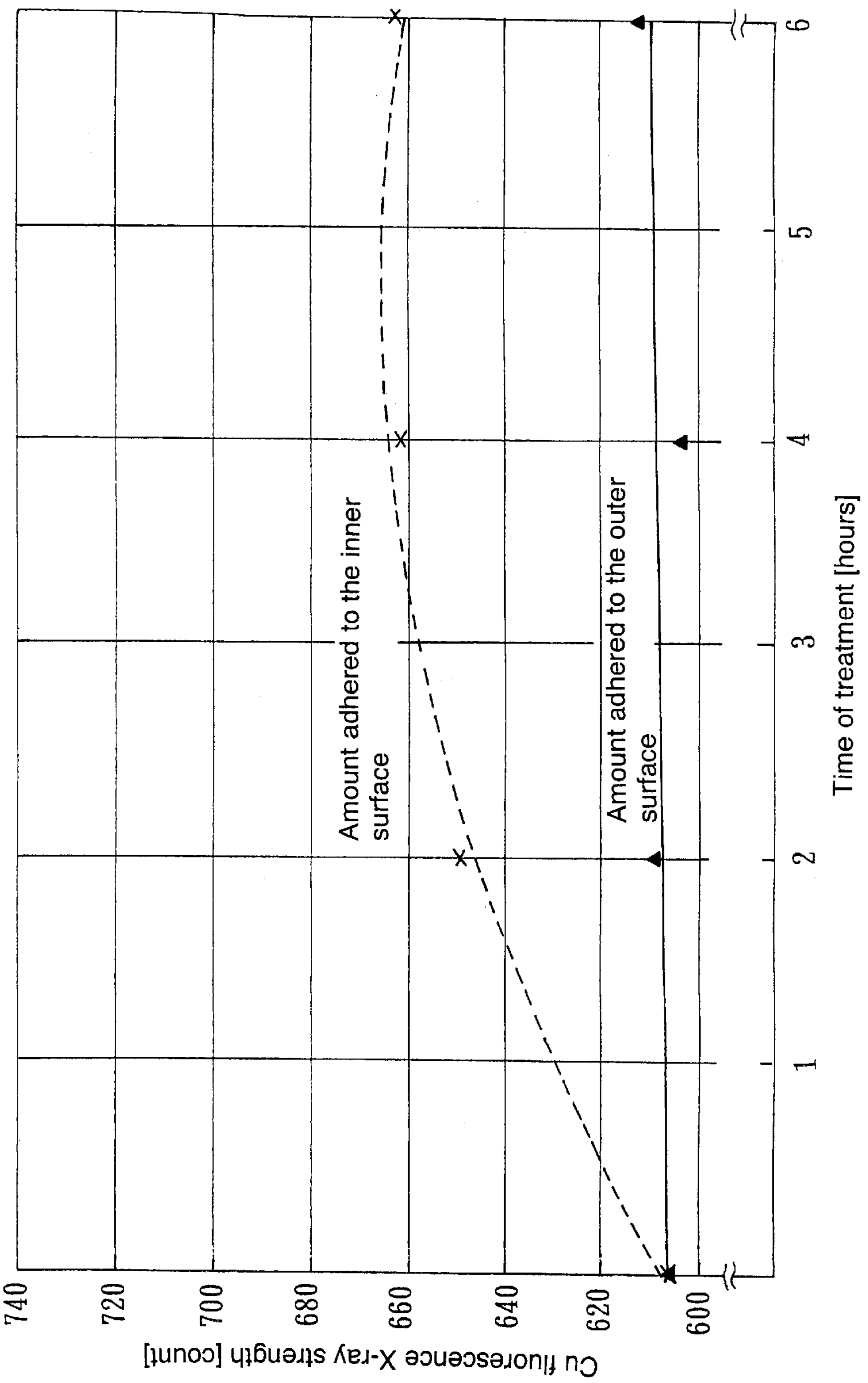
FIG. 15 is a graph showing the relationship between the time of treatment of the magnet under the yet further condition according to the present invention and the Cu fluorescence X-ray strength.

When the rotational speed was of 200 rpm, the media 24 had a good flowability within the through-hole in the magnet 23, as shown in FIG. 14, and the adhesion of the fine Cu powder to the inner surface of the magnet was observed, as shown in FIG. 15.

Example 6

The following experiments were carried out using ring-shaped bonded magnets having L/D values shown in Table 1.

Experiment Method a

The number of ring-shaped bonded magnets shown in Table 1 were placed into a cylindrical vessel made of copper (Cu) and having an inside diameter of 32 mm and a length of 50 mm, so that their center axes were parallel to a center axis of the cylindrical vessel. Further, a pipe of copper having a diameter of 8 mm and a length of 45 mm was inserted through and disposed in a through-hole in the magnet. A fine Cu powder producing material comprising short columnar pieces (which was made by cutting a wire) having a diameter of 0.6 mm and a length of 0.6 mm was placed into the cylindrical vessel in an amount of 50% by volume of the internal volume of the cylindrical vessel. Then, the vessel was rotated about its center axis at a rotational speed of 150 rpm by use of a rotated-type ball mill apparatus.

Experiment Method b

The fifty ring-shaped bonded magnets shown in Table 1 and 10 kg (an apparent volume of 2 l) of the fine Cu powder producing material comprising the short columnar pieces (which was made by cutting a wire) having a diameter of 0.6 mm and a length of 0.6 mm was placed into a treating vessel in a vibrated-type barrel finishing machine having a volume of 3.5 l, where they were treated under conditions of a vibration frequency of 60 Hz and a vibration amplitude of 1.5 mm.

Result of Experiments

The variation in amount of fine Cu powder adhered to the inner surface of the magnet with the passage of time was examined at intervals of 2 hours to a time point after lapse of 10 hours from the start of the treatment by a Cu $K^{\alpha}$-ray strength measurement with an electron probe microanalyzer (EPMA) using a standard sample (an apparatus used was EPM-810 made by Shimadzu, Co.). Results are shown in FIG. 16.

Figure 16:
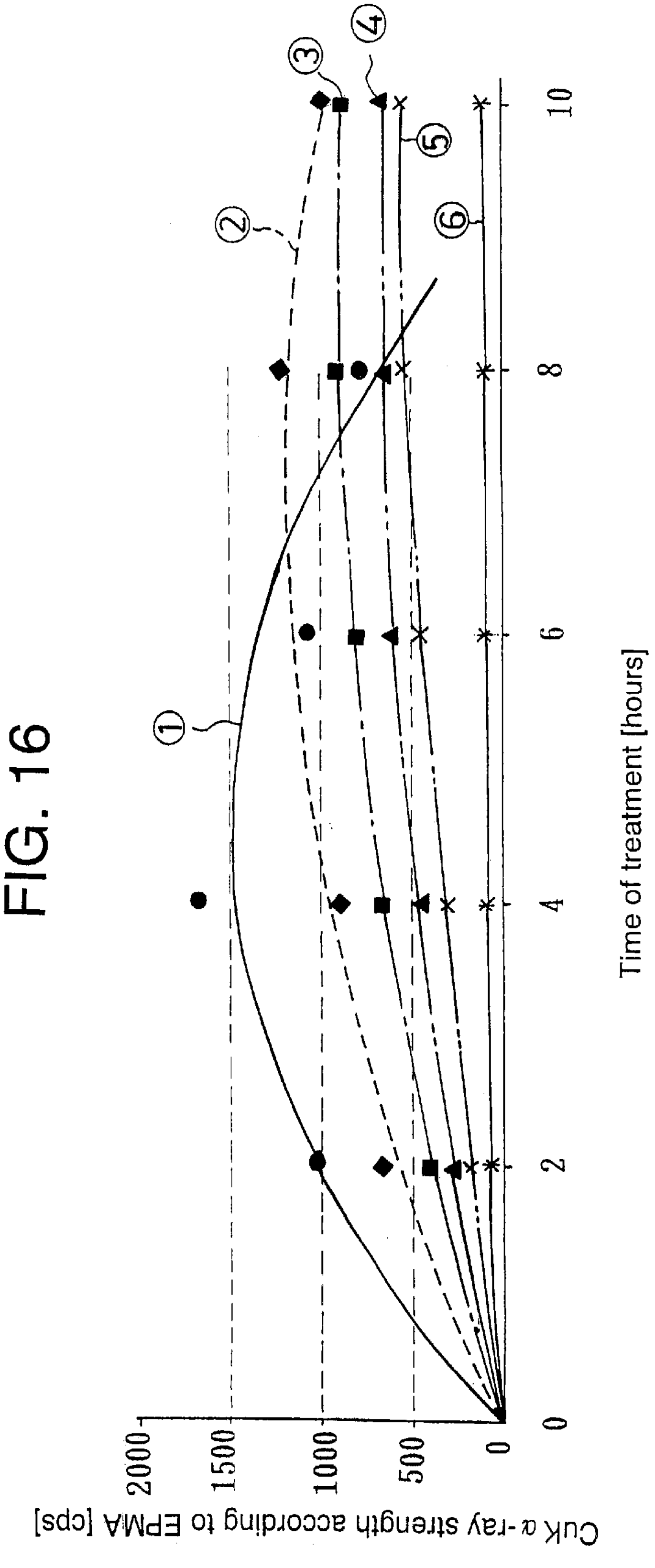
FIG. 16 is a graph showing the relationship between the time of treatment of the magnet according to the present invention and the Cu $K^{\alpha}$-ray strength according to EPMA.

When the treatment was carried out according to the experiment method a, the amount of fine Cu powder adhered to any of the magnets was varied to draw a curve shown by ① in FIG. 16, and reached a maximum value in 4.5 hours after the start of the treatment. Thereafter, the amount was decreased, and this was considered to be because some of fine Cu powder-adhered particles in the magnetic powder were dropped by the collision against the contents of the vessel.

Particles in the fine Cu powder produced by the above-described treatment had longer diameters in a range of a very small longer diameter of 0. 1 μm or less to a largest longer diameter of about 5 μm.

For example, in the case of the magnet treated for 4.5 hours from the start of the treatment, a film layer made of the

TABLE 1

| | Outside diameter (mm) | Inside diameter D (mm) | Length L (mm) | L/D value | Number of magnets placed in Experiment method a | Another |
|---|---|---|---|---|---|---|
| Magnet 1 | 22.5 | 20 | 2.6 | 0.13 | 16 | |
| Magnet 2 | 22 | 20 | 6.5 | 0.33 | 7 | the same magnet as in Examples 1 to 5 |
| Magnet 3 | 22.5 | 20.7 | 10.5 | 0.51 | 4 | |
| Magnet 4 | 22 | 20 | 20 | 1 | 2 | |
| Magnet 5 | 13 | 9 | 19 | 1.67 | 2 | |

fine Cu powder was formed on the entire surface of the magnet. The roughening of the surface of the film layer was inconspicuous in appearance. This was considered to be attributable to an effect of the pipe of cupper inserted through and disposed in the through-hole in the magnet. It was also found that the film layer made of the fine Cu powder and having a thickness of 0.1 μm was formed on the metal forming the surface of the magnet. It was further found that the fine Cu powder was forced uniformly into the resin portion of the surface of the magnet to cover the resin portion.

When the treatment was carried out according to the experiment method b, there was a difference in amount of fine Cu powder adhered to the surface between the magnets. In the magnet 1 having the smallest L/D value, the fine Cu powder was adhered in an amount of 1,000 cps or more, as shown by ② in FIG. 16. However, in the magnet 2 (shown by ③ in FIG. 16) and in the magnet 3 (shown by ④ in FIG. 16), as the L/D value was increased, the amount of fine Cu powder adhered was decreased. In the magnet 4 having the L/D value of 1, the adhesion of the fine Cu powder in an amount of 500 cps was made possible by a treatment for a longer time, as shown by ⑤ in FIG. 16, but in the magnet 5 having the L/D value of 1.67, the amount of fine Cu powder adhered was not increased, even if the treatment was carried out for a longer time (shown by ⑥ in FIG. 16).

It was found from the above results that when the treatment was carried out according to the experiment method a, the fine Cu powder could be adhered uniformly and efficiently even to the magnets having different L/D values in a shorter treating time without changing of the conditions.

Example 7

The magnets in Example 3 and each having the film layer made of the fine Cu powder (i.e., the magnet produced by the treatment for 2 hours, the magnet produced by the treatment for 4 hours and the magnet produced by the treatment for 6 hours) were washed and subjected to an Ni electroplating treatment under conditions of a current density of 1.5 A/dm$^2$, a plating time of 60 minutes, a pH value of 4.2 and a bath temperature of 55° C. using a plating solution having a composition comprising 240 g/l of nickel sulfate, 45 g/l of nickel chloride, an appropriate amount of nickel carbonate (having a pH value regulated) and 30 g/l of boric acid (n=5).

The inner and outer surfaces of the resulting magnets (i.e., the plated products) were observed using a stereo-microscope (having a magnification of 15), thereby examining the presence or absence of pinholes due to an insufficient electric conductivity. As a result, no pinhole was present in the inner surface of any of the magnets. On the other hand, pinholes were present on the outer surface of only the magnet produced by the treatment for 2 hours.

It was found from the above results that it is necessary to adhere the fine Cu powder having a Cu fluorescence X-ray strength on the order of 630 count under the conditions in the experiments, in order to provide the surface of the magnet with an electric conductivity enough to form a plated film having an excellent corrosion resistance. Therefore, it was found from the judgment from this criterion that in order to adhere the fine Cu powder to the surface of the magnet in an amount permitting a sufficient electric conductivity to be provided under the conditions in Example 3, the inner surface may be treated for 1 hour or more, while the outer surface may be treated for 4 hours or more (see FIG. 11).

The thickness accuracy of the plated product of the magnet treated for 6 hours was examined by a fluorescence X-ray strength measurement (an apparatus used was SFT-7100 made by Seiko Instruments and Electronics, Ltd.). As a result, it was found that the film was formed at 20±3 μm on the outer surface and 15±2 μm on the inner surface, i.e., at a high thickness accuracy.

Example 8

The magnet 5 treated according to the experiment method a and the magnets 1 to 5 treated according to the experiment method b in Example 6 were subjected to an electroplating treatment under the same conditions as in Example 7 (n=5).

The inner surfaces of the resulting magnets (i.e., the plated products) were observed using a stereo-microscope (having a magnification of 15) thereby examining the presence or absence of pinholes due to an insufficient electric conductivity. Results are shown in Table 2.

TABLE 2

| | | Treated for 2 hours | Treated for 4 hours | Treated for 6 hours | Treated for 6 hours | Treated for 10 hours |
|---|---|---|---|---|---|---|
| Experiment method a | Magnet 5 | O | O | O | O | X |
| Experiment method b | Magnet 1 | O | O | O | O | O |
| Experiment method b | Magnet 2 | X | O | O | O | O |
| Experiment method b | Magnet 3 | X | X | O | O | O |
| Experiment method b | Magnet 4 | X | X | X | O | O |
| Experiment method b | Magnet 5 | X | X | X | X | X |

O: There was no pinhole
X: There were pinholes

It was found from the results shown in Table 2 that it is necessary to adhere the fine Cu powder having a Cu K$^{\alpha}$-ray strength as large as 500 cps measured by EPMA under the conditions in the experiments, in order to provide the surface of magnet with an electric conductivity enough to form a plated film having an excellent corrosion resistance. Therefore, it was found from the judgment from this criterion that if the treatment is conducted for 1 hour or more under the conditions in the experiment method a, an amount of the fine Cu powder enough to provide a sufficient electric conductivity can be adhered to the inner surface of even the magnet having an L/D value equal to or larger than 1 (see FIG. 16).

What is claimed is:

1. A process for surface treatment of a hollow work having a hole communicating with the outside, comprising the steps of placing the work and a fine metal powder producing material into a treating vessel, said fine metal powder producing material having a longer diameter size of from 0.05 mm to 10 mm, and bringing said fine metal powder producing material into flowing contact with the surface of said work in said treating vessel in a dry manner, thereby adhering a fine metal powder produced from said fine metal powder producing material to the surface of said work.

2. A surface treatment process according to claim 1, wherein the flowing contact of said fine metal powder producing material with the surface of said hollow work is achieved by rotating said treating vessel.

3. A surface treatment process according to claim 2, wherein said treating vessel is cylindrical in shape, and the flowing contact of said fine metal powder producing material with the surface of said hollow work is achieved by rotating said cylindrical treating vessel about its center axis.

4. A surface treatment process according to claim 1, wherein said hollow work having the hole communicating with the outside is a ring-shaped work.

5. A surface treatment process according to claim 4, wherein said ring-shaped work is placed into said cylindrical treating vessel, so that its center axis is parallel to a center axis of said cylindrical treating vessel, and the flowing contact of said fine metal powder producing material with the surface of said ring-shaped work is achieved by rotating said cylindrical treating vessel about its center axis.

6. A surface treatment process according to claim 5, wherein a rod-shaped member is inserted through and disposed in the through-hole in said ring-shaped work, so that it is parallel to the center axis of said ring-shaped work.

7. A surface treatment process according to claim 4, wherein said ring-shaped work is a ring-shaped rare earth metal-based permanent magnet.

8. A surface treatment process according to claim 7, wherein said ring-shaped rare earth metal-based permanent magnet is a ring-shaped bonded magnet.

9. A surface treatment process according to claim 1, wherein said fine metal powder producing material is a material for producing a fine powder of at least one metal selected from the group consisting of Cu, Fe, Ni, Co, Cr, Sn, Zn, Pb, Cd, In, Au, Ag and Al.

10. A surface treatment process according to claim 9, wherein said fine metal powder producing material is a fine Cu powder producing material.

* * * * *